United States Patent Office 3,375,266
Patented Mar. 26, 1968

3,375,266
BIS-TRINITROETHYL CARBONATE AND
PROCESS OF PREPARATION
Marion E. Hill, Kensington, Md., assignor to the United
States of America as represented by the Secretary of
the Navy
No Drawing. Continuation-in-part of application Ser. No.
496,632, Mar. 24, 1955. This application Oct. 17, 1956,
Ser. No. 616,579
6 Claims. (Cl. 260—463)

This application is a continuation-in-part of my copending application Ser. No. 496,632, filed Mar. 24, 1955, now abandoned.

The invention described herein may be manufactured and used by or for the Government of the United States of America for governmental purposes without the payment of any royalties thereon or therefor.

This invention relates to the preparation of polynitroaliphatic compounds. More particularly, the invention relates to a new and useful polynitroaliphatic compound bis [trinitroethyl] carbonate and to a process for the preparation of this compound.

It has long been known that the chlorocarbonic esters, $Cl-COO-C_nH_{2n+1}$, the esters of the semi-chloride of carbonic acid are formed by the reaction of phosgene and the alcohols in accordance with the following typical equation:

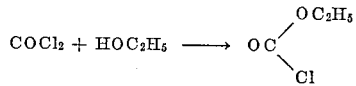

The chlorine atom of the chlorocarbonic ester is then much more slowly replaced by the ethoxy radical:

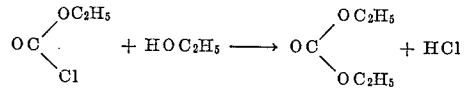

The phosgene reacts very readily with ordinary "basic" aliphatic alcohols at low temperatures but it has been found to be very difficult to prepare the carbonate of an acidic alcohol by this reaction. For example, it is necessary in the preparation of the carbonate of an "acidic" alcohol such as phenol to first prepare the chlorocarbonate in a hot sealed tube and then react the isolated chlorocarbonated with sodium phenolate. The reduced reactivity of acidic nitro substituted alcohols prevents even the reaction between molten 2,2,2-trinitroethanol and the phosgene. The presence of the nitro groups in the beta position of an alcohol greatly decreases the reactivity of the hydroxyl group. This has been found to be particularly true in the case of 2,2,2-trinitroethanol where the presence of the trinitromethyl group reduces the reactivity of the hydroxyl group by many thousandfold compared to that of an ordinary alcohol.

As described in the above-mentioned application, I have discovered that 2,2,2-trinitroethanol may be caused to react with phosgene by the addition to the reaction mixture of a small quantity of a metal halide catalyst. The result of the reaction is a new and useful high explosive compound bis [trinitroethyl] carbonate.

It is, therefore, an object of the present invention to provide a new and useful process for the preparation of esters of 2,2,2-trinitroethanol.

Another object is to provide a new and useful explosive compound having an unusually high oxygen content.

Other objects and the attendant advantages of the invention will become apparent to those skilled in the art as the invention is described in the following detailed description.

The above objects are achieved accordingly to the process of the present invention through the reaction of 2,2,2-trinitroethanol and phosgene, $CO\ Cl_2$, in the presence of a small quantity of a metal halide catalyst.

The process of the invention may be conducted by one of several procedures. The reaction is best performed in an inert solvent such as carbon tetrachloride or chloroform. The preferred procedure and the one which appears to produce the best results is to mix the 2,2,2-trinitroethanol with the metal halide catalyst in a chloroform solution and then add the phosgene. The reaction solution is then held at 50° C. for 72 hours in a closed container of suitable construction to prevent escape of the phosgene.

An alternative procedure is to add, at room temperature, excess trinitroethanol and a catalytic amount of the metal halide catalyst to a carbon tetrachloride solution of phosgene. The mixture is then held at 40° C. for a few hours after which it is refluxed briefly and worked up.

A variation of this procedure is to add a solution of phosgene in carbon tetrachloride to the catalyst-carbon tetrachloride mixture. Then an excess of 2,2,2-trinitroethanol is added and the reaction solution warmed to reflux temperature. Only a 10% yield was obtained by the latter procedure, however, as little reaction was noted until the reaction solution was heated and the heat requirement makes it difficult to keep the phosgene in solution.

Another procedure is to prepare a complex such as $Al_2Cl_5 \cdot COCl_2$ by dissolving the catalyst in liquid phosgene and boiling off the excess before adding the 2,2,2-trinitroethanol in carbon tetrachloride solvent. Yields obtained by this procedure are not considered to be satisfactory.

The catalysts which may be employed in the process of the invention are those commonly referred to as the Friedel Crafts type. Of these, anhydrous aluminum chloride is by far the most reactive. Other catalysts of this type such as aluminum bromide are less effective but nevertheless useable in the reaction.

The novel chemical compound of the invention bis [trinitroethyl] carbonate produced by the process described above is presumed to have the following structural formula:

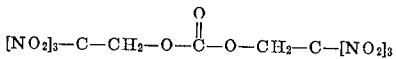

The foregoing method of preparation may be illustrated for purposes of clarity only by the following equation:

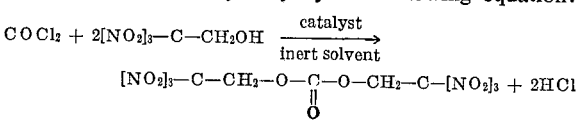

The following examples are given to illustrate the process of the invention and are not to be considered as limiting the scope of invention in any manner.

Example 1

Trinitroethanol [40 g.; 0.22 mole] was added to a solution of 9.9 g. [0.10 mole] of phosgene in 250 ml. of carbon tetrachloride kept cold by an ice bath. When the trinitroethanol had dissolved, 6.5 g. [0.05 mole] of crushed anhydrous aluminum chloride was added. There was some reaction at the temperature of the ice bath but warming to 40° C. was necessary before an appreciable rate of hydrogen chloride gas evolution was obtained. Brine at −10° C. was used in a small bore condenser to return carbon tetrachloride and phosgene dissolved therein to the reaction mixture. An additional 6.5 g. [0.05 mole] of aluminum chloride was then added and the solution became nearly homogeneous. The reaction vessel was held at 40° C. for 3 hours, warmed to reflux temperature over a period of 1 hour, and then refluxed 1 hour. At the higher temperatures hydrogen chloride evolution was quite rapid. The reaction mixture was cooled and swept out with nitrogen to remove HCl, diluted with hexane, and then cooled to −20° C. Filtration of the reaction mixture removed a gummy solid which was treated with dilute hydrochloric acid. The solid was partially soluble in dilute HCl and an oil remained, which was extracted with chloroform. Evaporation of the filtered reaction mixture left an oil which was taken up in chloroform. This chloroform solution was added to the above chloroform extract, washed with water, dried, and evaporated. Recrystallization of the crude product thus obtained gave 4.0 g. of bis[trinitroethyl]carbonate, M.P. 115°–116° C., crystal density 1.88.

*Analysis.*—Calculated: C, 15.47; H, 1.04. Found: C, 15.55; H, 1.04.

*Example II*

Crushed aluminum chloride [26.6 g.; 0.20 mole] was placed in a reaction vessel fitted with reflux condenser and 150 ml. of chloroform added. To this mixture, a carbon tetrachloride solution of phosgene [containing 9.9 g.; 0.10 mole phosgene] was added at 10° C. Then at room temperature, 40 g. [0.22 mole] of trinitroethanol in 200 ml. of chloroform was added. No reaction was apparent, and hydrogen chloride did not evolve at a moderate rate until reflux temperature was reached. The reaction mixture was then refluxed for 1 hour, and the solution worked up and 4.3 g. of bis[trinitroethyl]carbonate isolated as in Example I.

*Example III*

To a solution of 18.1 g. [0.10 mole] of trinitroethanol in 150 ml. of chloroform, 13.3 g. [0.10 mole] of crushed aluminum chloride was added at room temperature. The mixture was gradually warmed to reflux temperature until solution was complete. The solution was cooled to 0° C. and an equivalent amount of phosgene [5.0 g.] was bubbled into the solution. The reaction mixture thus prepared was then poured into a 250 ml. stainless steel cylinder which was equipped with a Teflon gasket one-quarter inch thick at the opening, and heated at 50° C. for 72 hours. The reaction mixture was treated and 6.8 g. of bis-[trinitroethyl]carbonate [35%] isolated as in Example I.

*Example IV*

A mixture of 18.1 g. [0.10 mole] of trinitroethanol and 6.7 g. [0.05 mole] of powdered aluminum chloride was prepared and placed in a pressure reaction vessel as described in Example III, and then 40 ml. of liquid phosgene was added thereto. After closure, the vessel was warmed gradually to room temperature, shaken several times and then warmed to 50° C. and held for a period of 19 hours. After cooling the excess phosgene was vented, the vessel opened and the contents transferred to a 200 ml. carbon tetrachloride solution of 18.1 g. of trinitroethanol. The resulting solution was heated to 76° C. and held at this temperature for 8 hours. Filtration of the cooled reaction mixture isolated a fine white solid which partially decomposed in iced hydrochloric acid solution. Filtration and drying of the residual solid and recrystallization from chloroform-hexane gave 11 g. of bis[trinitroethyl] carbonate. The filtered mother liquor was diluted with ether and extracted with water and sodium bicarbonate solution. After drying and evaporating the solvent an additional 10 g. of bis [trinitroethyl] carbonate was obtained.

The properties of the novel chemical compound of the invention bis [trinitroethyl] carbonate are listed in the following Table I:

TABLE I.—PROPERTIES OF BIS [TRINITROETHYL] CARBONATE

| | |
|---|---|
| Crystal density | 1.88. |
| Oxygen content | 61.8% of molecular wt. |
| Vacuum stability | 0.88 cc. of gas per gm. after 48 hrs. at 100° C. |
| Impact sensitivity [50% pt., 2½ kg. wt. NOL] | 16 cm. |
| Melting point | 115° C. |

Bis [trinitroethyl] carbonate is an extremely useful military high explosive. The compound has an unusually high oxygen content as oxygen comprises 61.8% of the molecule or 1.162 g. of oxygen per cubic centimeter based on its crystal density of 1.88. Thus the oxygen content is superior even to liquid oxygen which has 1.14 g. per cubic centimeter. This extremely favorable oxygen content is unique in explosive technology and makes bis [trinitroethyl] carbonate particularly useful in metallized explosive compositions. It is used in mixtures with powdered aluminum in quantities sufficient to convert all its oxygen to aluminum oxide $Al_2O_3$ and with other explosive compounds such as a 70/30 mixture with TNT. It forms a constant melting mixture [95° C.] with picric acid and with picric acid plus RDX [87° C.]. In these mixtures it forms a castable high explosive, the percentage composition of which can be varied depending on the type of weapon in which it is used.

A multicomponent mixture which is particularly useful in guided missile warheads to produce airblast is as follows:

| | Percent |
|---|---|
| Bis [trinitroethyl] carbonate | 31 |
| Trinitrobenzene | 10 |
| RDX | 22 |
| Aluminum | 31 |
| Wax | 5 |

Another mixture which is useful for underwater use is as follows:

| | Percent |
|---|---|
| Bis [trinitroethyl] carbonate | 26 |
| Trinitrobenzene | 10 |
| RDX | 22 |
| Aluminum | 37 |
| Wax | 5 |

Bis [trinitroethyl] carbonate has a higher crystal density than either RDX or TNT and therefore gives more explosive power when used in a warhead of fixed size in place of or mixed with either of these compounds. The sensitivity of bis [trinitroethyl] carbonate does not compart unfavorably with that of RDX and it can be used alone, with a small amount of wax [5–10%] to desensitize as a castable explosive in mines, torpedoes, depth charges and the like. The usual detonating devices used in explosive technology will explode bis [trinitroethyl] carbonate and its mixtures.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The explosive chemical compound having the formula

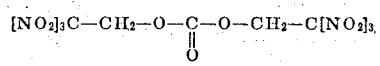

2. The process for the preparation of bis [2,2,2-trinitroethyl]carbonate comprising reacting phosgene with 2,2,2-trinitroethanol in the presence of a metal halide catalyst of the Friedel Crafts type.

3. The process for the preparation of bis(2,2,2-trinitroethyl) carbonate comprising reacting phosgene with 2,2,2-trinitroethanol in the presence of a metal halide catalyst selected from a group consisting of aluminum chloride and aluminum bromide.

4. The process of claim 3 in which the catalyst is aluminum chloride.

5. The process of claim 3 in which the catalyst is anhydrous aluminum bromide.

6. The process of claim 3 in which the catalyst is aluminum chloride and the reaction takes place in an inert organic solvent.

References Cited

UNITED STATES PATENTS 2,787,631  4/1957  Stevens _____ 260—463

FOREIGN PATENTS 135,832  5/1952  Sweden.

CHARLES B. PARKER, *Primary Examiner.*
R. L. CAMPBELL, *Examiner.*
L. A. SEBASTIAN, *Assistant Examiner.*